United States Patent [19]

Sunahara et al.

[11] Patent Number: 4,987,421
[45] Date of Patent: Jan. 22, 1991

[54] MICROSTRIP ANTENNA

[75] Inventors: Yonehiko Sunahara; Makoto Matsunaga; Seiji Mano; Hiroyuki Ohmine, all of Kanagawa; Makio Tsuchiya, Amagasaki, all of Japan

[73] Assignee: Mitsubishi Denki Kabushiki Kaisha, Tokyo, Japan

[21] Appl. No.: 363,050

[22] Filed: Jun. 8, 1989

[30] Foreign Application Priority Data

Jun. 9, 1988 [JP] Japan .................. 63-76709[U]
Oct. 21, 1988 [JP] Japan .................. 63-266961
Feb. 21, 1989 [JP] Japan .................. 1-40580

[51] Int. Cl.⁵ .................................................. H01R 1/38
[52] U.S. Cl. ............................ 343/700 MS; 343/769; 343/850
[58] Field of Search ............... 343/700 MS, 769, 846, 343/850, 767, 768

[56] References Cited

U.S. PATENT DOCUMENTS

| | | | |
|---|---|---|---|
| 4,170,013 | 10/1979 | Black | 343/700 MS |
| 4,320,402 | 3/1982 | Bowen | 343/700 MS |
| 4,509,209 | 4/1985 | Itoh et al. | 343/700 MS |
| 4,835,540 | 5/1989 | Haruyama et al. | 343/700 MS |

FOREIGN PATENT DOCUMENTS

| | | | |
|---|---|---|---|
| 79713 | 5/1985 | Japan | 343/700 MS |
| 217702 | 10/1985 | Japan | 343/700 MS |

OTHER PUBLICATIONS

Bhattacharyya et al., IEEE Trans. on Antennas and Prop., vol. AP-33, No. 3, 6/85.
Bahl et al., "Microstrip Antennas", Artech House, Inc. 1982, Canada.
"Antenna Engineering Handbook", Ohm Co., 1980, Japan, FIG. 3, p. 110.

Primary Examiner—Michael C. Wimer
Attorney, Agent, or Firm—Wolf, Greenfield & Sacks

[57] ABSTRACT

A microstrip antenna has an annular radiation conductor with a central opening and a microwave circuit for connecting the annular radiation conductor to a feeder to thereby facilitate impedance matching.

29 Claims, 15 Drawing Sheets

FIG. 15 (a) PRIOR ART
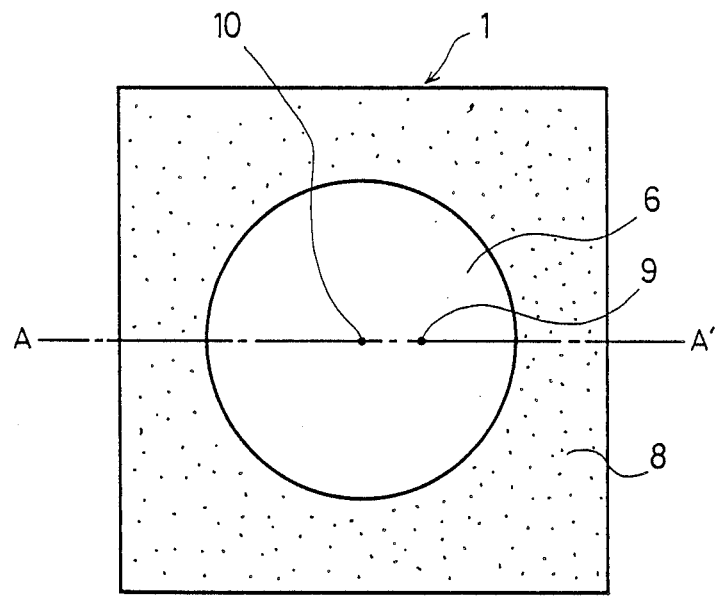
FIG. 15 (b) PRIOR ART
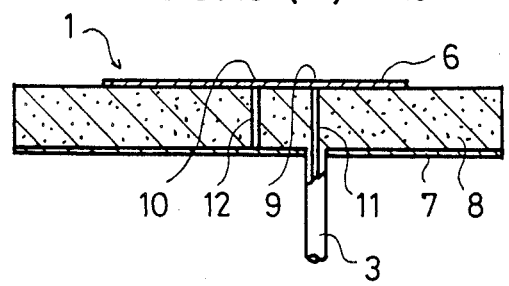

MICROSTRIP ANTENNA

BACKGROUND OF THE INVENTION

This invention relates to microstrip antennas for an array antenna.

The transmitter side of a conventional antenna system such as described in "Present Solid State Phased Array Radars," *Nikkei Electronics*, July 17, 1972, is shown in FIG. 14. This antenna system includes a microstrip antenna 1 which is an elementary antenna, a high-power amplifier 2, a coaxial cable 3 connecting the microstrip antenna 1 and the high-power amplifier 2, a pin-diode phase shifter 4, and an oscillator 5. An example of the microstrip antenna 1 is shown in FIG. 3.75 on page 110 of "Antenna Engineering Handbook," Ohm Co.

FIGS. 15(a) and 15(b) show a conventional microstrip antenna. The microstrip antenna 1 includes a radiation conductor 6 with the center 10, a ground conductor 7, a dielectric body 8 sandwiched between the radiation and ground conductors, a feeder 11 connected to the radiation conductor 6 at a feeding point 9, and a plated through-hole 12 connecting the radiation conductor 6 and the ground conductor 7.

In operation, a signal generated by the oscillator 5 is provided with a shift quantity quantized by the pin-diode phase shifter 4. The signal is then amplified by the high-power amplifier 2 to excite the microstrip antenna 1 via the feeder 11. When the power is supplied to the radiation conductor 6 at the feeding point 9 via the feeder 6, the electromagnetic field within the dielectric body 8 between the radiation conductor 6 and the ground conductor 7 resonates in such a way that it has an peak value at the periphery of the radiation conductor 6, transmitting an electromagnetic wave into space.

The diameter of such a microstrip antenna excited in the TM11 mode is about $0.586/\epsilon r$ wavelength, wherein $\epsilon r$ is the relative permittivity. Consequently, the degree of mutual coupling in an array antenna is disadvantageously large. In addition, there is no room for providing an impedance matching circuit if necessary. As a result, in addition to the increased system size, the loss due to the feeder between the amplifier and the element antenna is disadvantageously high.

SUMMARY OF THE INVENTION

Accordingly, it is an object of the invention to provide a compact and low-loss microstrip antenna for which it is easy to provide an impedance matching circuit.

According to the invention there is provided a microstrip antenna which includes a dielectric body; an annular radiation conductor provided on one side of the dielectric body; a ground conductor provided on the other side of the dielectric body; a feeder provided within a central opening of the annular radiation conductor; and a microwave circuit for connecting the feeder and an inner periphery of the annular radiation conductor.

The above and other objects, features, and advantages of the invention will become more apparent from the following description when taken in conjunction with the accompanying drawings.

BRIEF DESCRIPTION OF THE DRAWINGS

FIGS. 15(a) and 15(b) are respective plan and sectional views of a microstrip antenna of the antenna system of FIG. 14.

DESCRIPTION OF THE PREFERRED EMBODIMENT

Figure 1A:
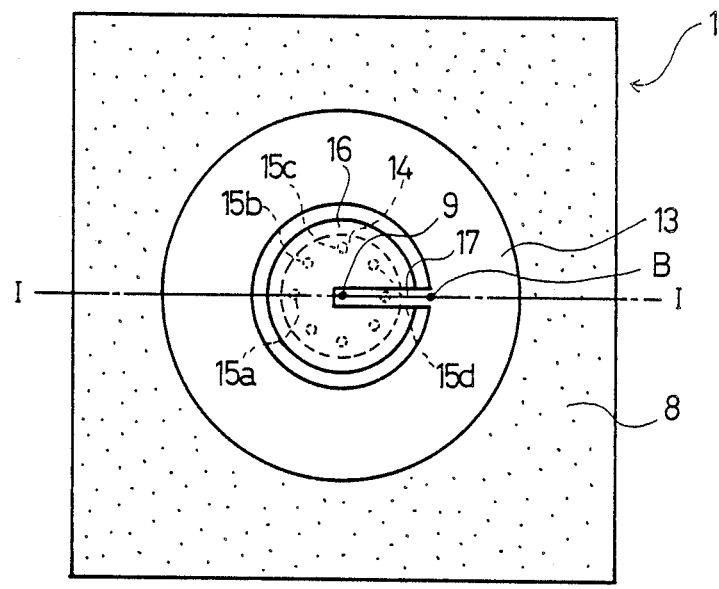
FIG. 1(a) is a plan view of a microstrip antenna according to an embodiment of the invention.
Figure 1B:
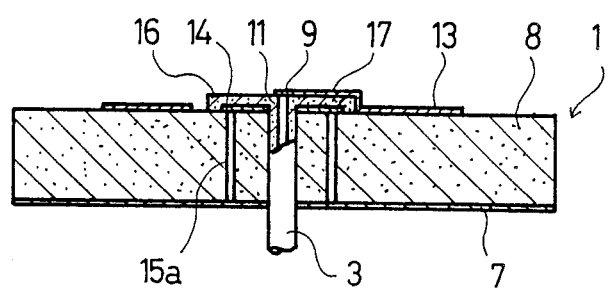
FIG. 1(b) is a sectional view taken along the line I—I of FIG., 1(a)

In FIGS. 1(a) and 1(b), members 3, 7, 8, 9, and 11 are identical with those of the conventional microstrip antenna in FIGS. 15(a) and 15(b). The microstrip antenna 1 further includes an annular radiation conductor 13 with a central circular opening, a conductor plate 14 formed on the dielectric body 8 within the central opening of the annular radiation conductor 13, plated through-holes 15a, 15b, 15c, 15d, etc. connecting the conductor plate 14 and the ground conductor 7, a dielectric substrate 16 for covering the conductor plate 14, a strip line 17 formed on the dielectric substrate 16 such that it extends from the inner periphery of the annular radiation conductor 13 to constitute a microwave circuit.

The resonation frequency of such a microstrip antenna, in which the electric field within the dielectric 8 resonates such that it has a peak value at the periphery of the annular radiation conductor 13, is given by $$Jn'(k\ nma) \times Nn'(k\ nmb) = Jn'(k\ nmb) \times Nn'(k\ nma)$$

wherein a and b are respective radii of the inner and outer peripheries of the annular radiation conductor 13, and $Jn'(x)$ and $Nn'(x)$ are respective derivatives of the first and second class cylindrical functions.

Now, if a/b=0.5 in the TM11 mode excitation, then b=0.212/αr wavelength. Thus, the size of the microstrip antenna is reduced to about 0.72 that of the conventional microstrip antenna.

In addition, if the length of the strip line 17 formed on the dielectric substrate 16 to feed power to the annular radiation conductor 13, with the conductor plate 14 as ground, is 0.25 wavelength, it is possible to match the impedance at the periphery of the annular radiation conductor 13 to the 50-ohm line.

Since the microwave circuit is provided within the central opening of the annular radiation conductor 13, it is possible to provide a compact microstrip antenna having a good impedance match with little loss.

FIGS. 2(a) and 2(b) show another microstrip antenna, wherein members 3, 7, 8, 9, 11, 13, 14, and 15a–15d are identical with those of FIGS. 1(a) and 1(b). This microstrip antenna includes a microwave integrated circuit 18 with input and output terminals 20a and 20b placed on the conductor plate 14 which serves as a ground conductor, a connector 19 connected to the feeder 11 for feeding power to the microwave IC 18, and a connection conductor 21 connecting the output terminal 20b to the annular radiation conductor 13.

This microstrip antenna produces the same results as those of the above embodiment. Since the microwave IC 18, which has a matching circuit and an amplifier, is provided within the central opening of the annular radiation conductor 13, it is possible to not only direct efficiently the received weak electromagnetic waves to the low-noise amplifier to thereby reduce the noise level but also provide the reduced antenna size which is especially advantageous in an array antenna wherein a plurality of such microstrip antennas are arranged.

As has been described above, in accordance with the invention there is provided a microstrip antenna which includes an annular radiation conductor 13 on a dielectric body 8 with a ground conductor 7, a microwave circuit 18 with a ground conductor 14 formed on the dielectric body within the central opening of the annular radiation conductor 13, and a feeder for feeding power to the annular radiation conductor via the microwave circuit to thereby provide a compact, lightweight, and low-loss microstrip antenna which is able to provide easy impedance matching.

Figure 2:
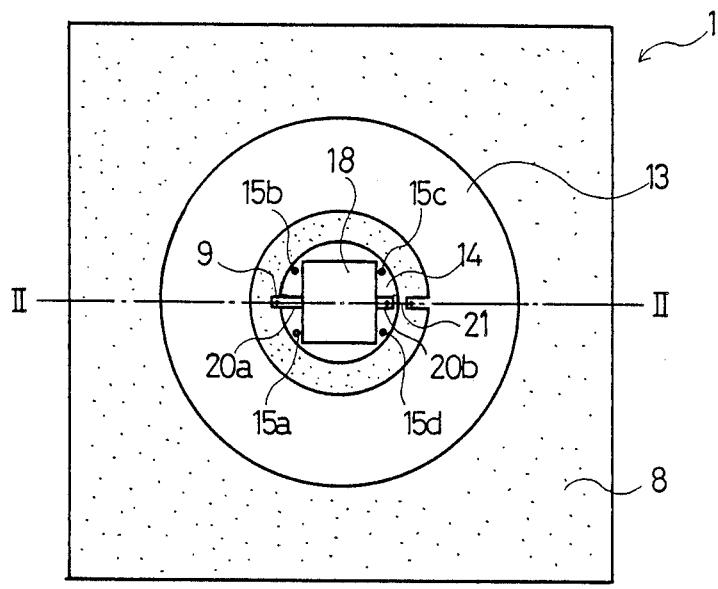
FIG. 2(a) is a plan view of a microstrip antenna according to another embodiment of the invention.
FIG. 2(b) is a sectional view taken along the line II—II of FIG. 2(a)
Figure 2:
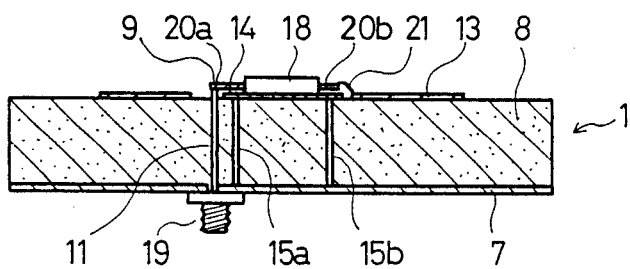
Figure 3:
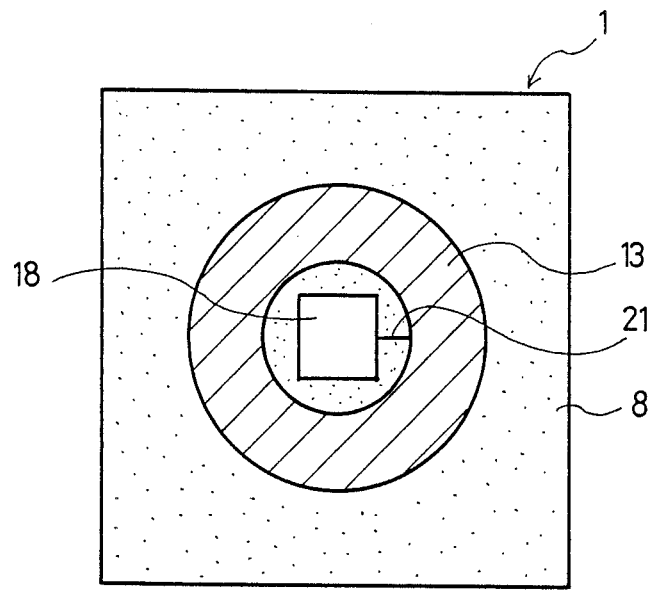
FIGS. 3(a) and 3(b) are respective plan and sectional views of a microstrip antenna according to still another embodiment of the invention.
Figure 3:
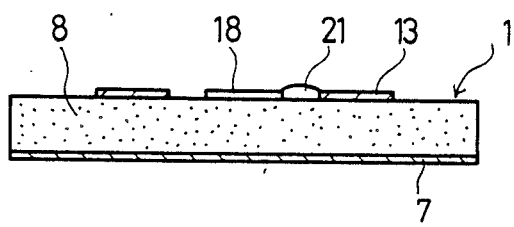

Alternatively, the microwave IC 18 may be placed directly on the dielectric body 8 as shown in FIGS. 3(a) and 3(b) to produce the same results as those of the FIG. 2 embodiment.

In general, the inner impedance of the annular radiation conductor 13 is high or about 100 ohms. For example, if the impedance at a point B in FIG. 1(a) is 300 ohms, in order to match a 50-ohm feeding system, it is necessary to provide a strip line 17 of $$\sqrt{300 \times 50} = 122\ (\text{ohms})$$

as an impedance converter of λg/4, wherein λg is the waveguide wavelength of the strip line 17. If the thickness of the dielectric body 8 is (t), then the width of a strip line 17 having a characteristic impedance of 50 ohms is 4 mm whereas the width of a strip line 17 having 140 ohms is very thin or 0.65 mm. Consequently, not only the radiation from the strip line 17 but also the loss is very high.

Figure 4:
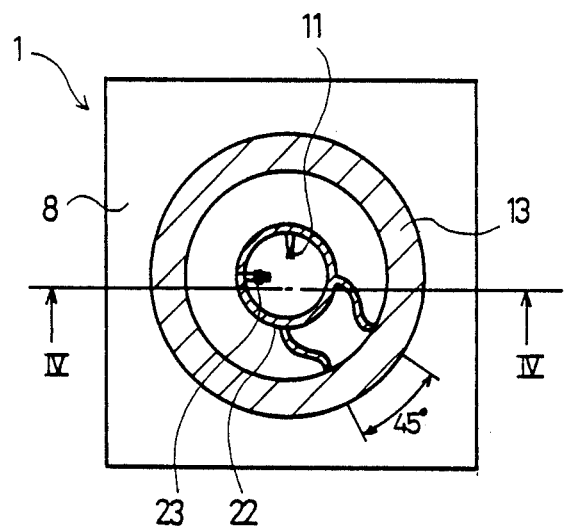
FIG. 4(a) is a plan view of a microstrip antenna according to yet another embodiment of the invention.
FIG. 4(b) is a sectional view taken along the line IV—IV of FIG. 4(a)
Figure 4:
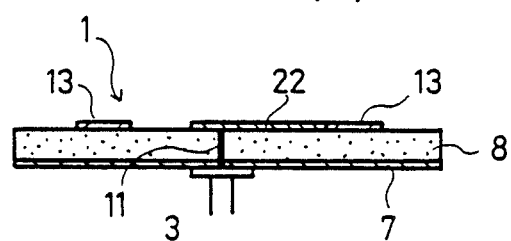

FIGS. 4(a) and 4(b) show a still another microstrip antenna which includes within the annular radiation conductor 13 a branched line hybrid circuit 22. The feeding point is shifted by 90 degrees, and the central angle between two connection points to the annular radiation conductor 13 is set at 45 degrees for providing circularly polarized excitation. If the branched line hybrid circuit 22 is made from a 300-ohm feeding system in the TM21 mode excitation, the width of a strip line 17 is not larger than 0.3 mm when the dielectric body 8 has a thickness of 1.6 mm. In this case, the radiation from and loss due to the strip line 17 are very high. Thus, both of the above structures have adverse effects on the radiation pattern.

A chip resistor 23 is provided to consume the power returned from the annular radiation conductor 13 due to mismatching. Since the feeding point is shifted by 90 degrees in the branched line hybrid circuit 22, circularly polarized waves are radiated in the direction perpendicular to the annular radiation conductor 13. In order to reduce the levels of radiation from and loss due to the strip line 17, a parasitic conductor 25 is opposed to the annular radiation conductor 13 via a dielectric or air layer 24.

FIGS. 5(a)–5(c) show such a microstrip antenna, wherein like reference numerals denote like members of the aforementioned conventional microstrip antenna. This microstrip antenna includes an air (or dielectric) layer 24, a parasitic conductor 25 opposed to the annular radiation conductor 13 via the air layer 24, and a dielectric plate 26 formed on the parasitic conductor 25.

When the power is supplied via the feeder 3 to excite the annular radiation conductor 13, the radiated electromagnetic field excites the parasitic conductor 25 via the air layer 24 to thereby transmit an electromagnetic field into space. In this embodiment, the thickness (t) of the dielectric body 8 is 0.8 mm, the inner diameter (a) and outer diameter (b) of the annular radiation conductor 13 are 15.0 mm and 27.0 mm, the radius (r) of the parasitic conductor 25 is 45.0 mm, and the thickness or height (h) of the air layer 24 is 7.0 mm.

Figure 6:
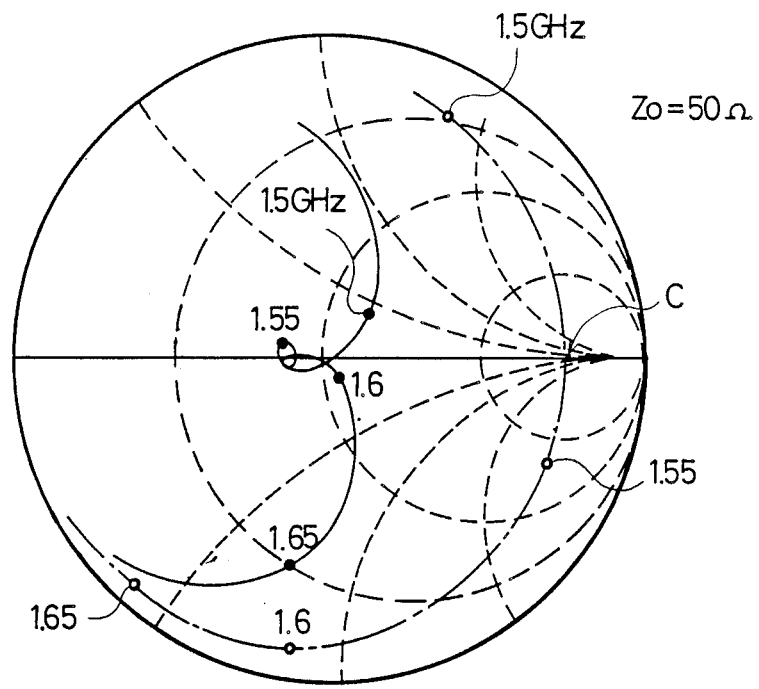
FIG. 6 is a graph showing the frequency characteristics of the input impedance of the microstrip antenna of FIG. 5(a)

FIG. 6 shows the frequency characteristics of the input impedance of the above microstrip antenna. The solid line represents the frequency characteristics when the parasitic conductor 25 is provided whereas the one-dot chain line represents the frequency characteristics when no parasitic conductor is used. The input impedance at the (resonance) point C on the one-dot chain line is about 360 ohms. Consequently, in order to match a feeding system having an input impedance (Zo) of 50 ohms, it is necessary to use an impedance converter of $\lambda g/4$, wherein $\lambda g$ is the wavelength, made from a microstrip line. However, the frequency characteristics of this embodiment shown by the solid line substantially indicates a substantial match with the 50-ohm feeding system so that it is not necessary to add any impedance matching device. By adding the parasitic conductor 25 it is also possible to broaden the bandwidth of frequency characteristics of the input impedance by about tenfold under such a condition as VSWR=2.

Figure 5:
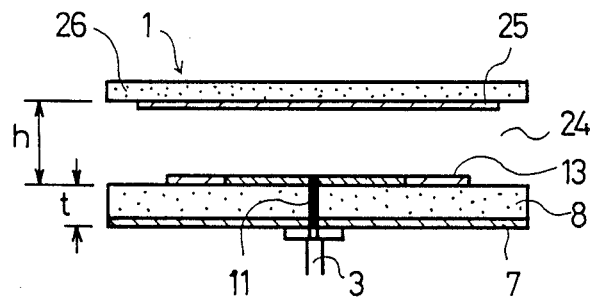
FIG. 5(a) is a sectional view of a microstrip antenna according to an embodiment of the invention.
FIG. 5(b) is a plan view of the a annular radiation conductor of the microstrip antenna of FIG. 5(a)
FIG. 5(c) is a plan view of the parasitic conductor of the microstrip antenna of FIG. 5(a)
Figure 5:
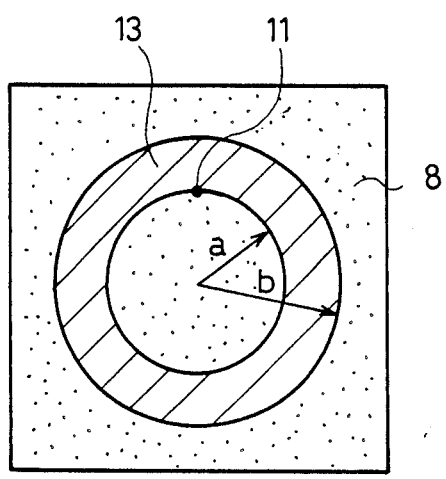
Figure 5:
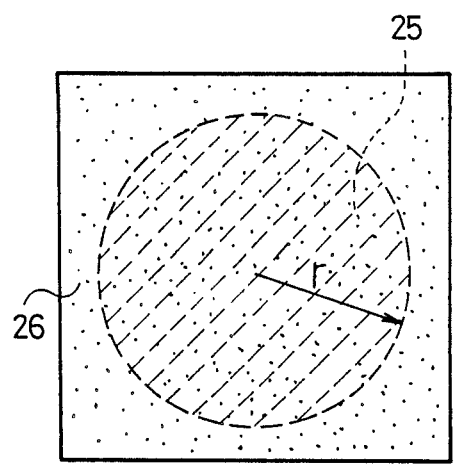
Figure 7:
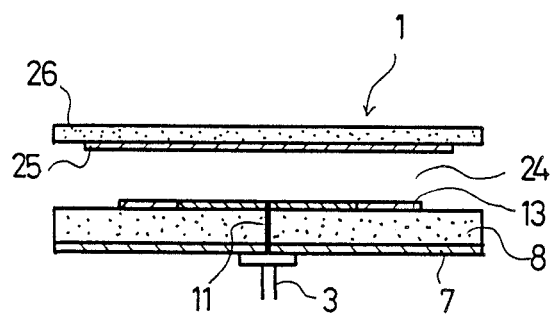
FIG. 7(a) is a sectional view of a microstrip antenna according to another embodiment of the invention.
FIG. 7(b) is a plan view of the a annular radiation conductor of the microstrip antenna of FIG. 7(a)
FIG. 7(c) is a plan view of the parasitic conductor of the microstrip antenna of FIG. 7(a)
Figure 7:
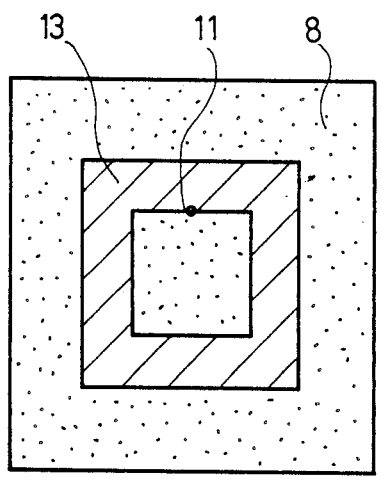
Figure 7:
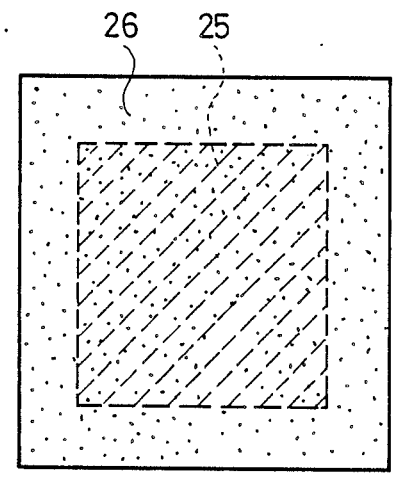

FIGS. 7(a)-7(c) show another microstrip antenna which is identical with the microstrip antenna of FIG. 5 except that the annular radiation conductor 13 and the parasitic conductor 25 are made in the form of a square. This structure, however, produces the same results as those of the microstrip antenna of FIG. 5.

Figure 8:
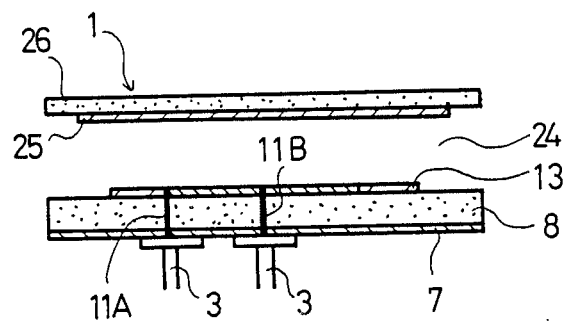
FIG. 8(a) is a sectional view of a microstrip antenna according to still another embodiment of the invention.
FIG. 8(b) is a plan view of the a annular radiation conductor of the microstrip antenna of FIG. 8(a)
FIG. 8(c) is a plan view of the parasitic conductor of the microstrip antenna of FIG. 8(a)
Figure 8:
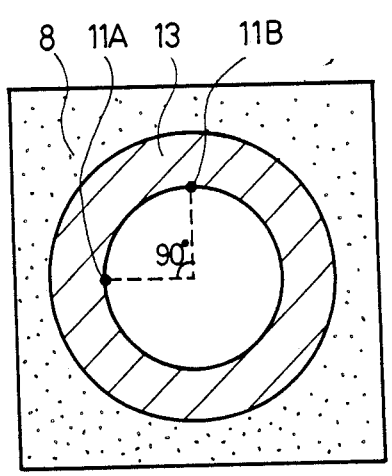
Figure 8:
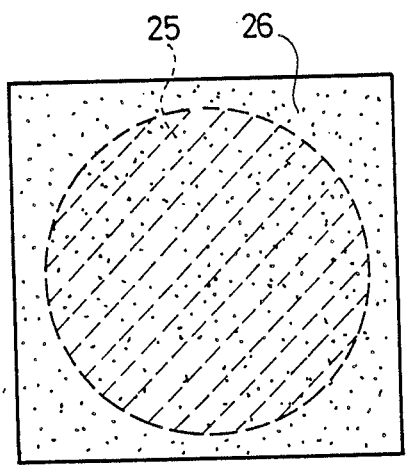

FIGS. 8(a)-8(c) show still another microstrip antenna which is identical with that of FIG. 5 except that two feeders 11A and 11B are connected to the inner periphery of the annular radiation conductor 13 at two points apart by a central angle of 90 degrees. By feeding power with a phase difference of 90 degrees, it is possible to provide circularly polarized excitation in the TM11 mode. In this embodiment, too, not only it is not necessary to provide any impedance matching device but also it is possible to broaden the frequency characteristics of the input impedance.

Figure 9:
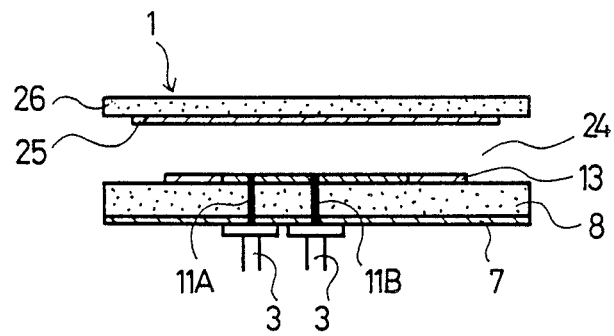
FIG. 9(a) is a sectional view of a microstrip antenna according to yet another embodiment of the invention.
FIG. 9(b) is a plan view of the a annular radiation conductor of the microstrip antenna of FIG. 9(a)
FIG. 9(c) is a plan view of the parasitic conductor of the microstrip antenna of FIG. 9(a)
Figure 9:
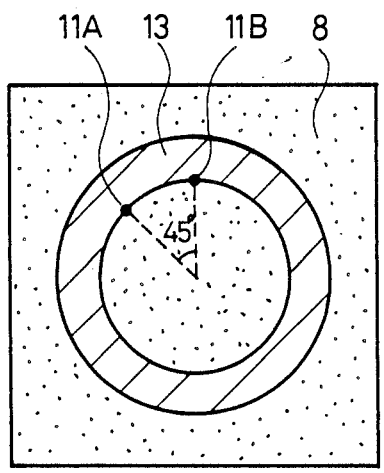
Figure 9:
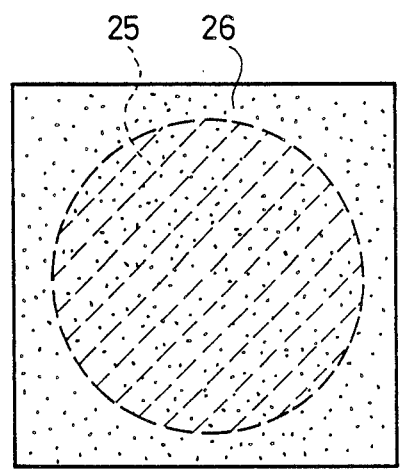

FIGS. 9(a)-9(c) show yet another microstrip antenna wherein two feeders 11A and 11B are provided at a central angle of 45 degrees. By feeding power with a phase difference of 90 degrees, it is possible to provide circularly polarized excitation in the TM21 mode. This structure, too, not only needs no impedance matching device but also is able to broaden the frequency characteristics of the input impedance.

Figure 10:
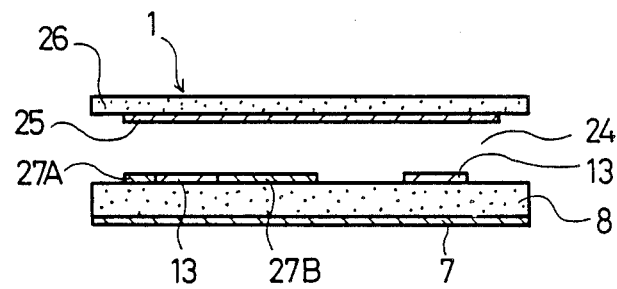
FIG. 10(a) is a sectional view of a microstrip antenna according to another embodiment of the invention.
FIG. 10(b) is a plan view of the a annular radiation conductor of the microstrip antenna of FIG. 10(a)
FIG. 10(c) is a plan view of the parasitic conductor of the microstrip antenna of FIG. 10(a)
Figure 10:
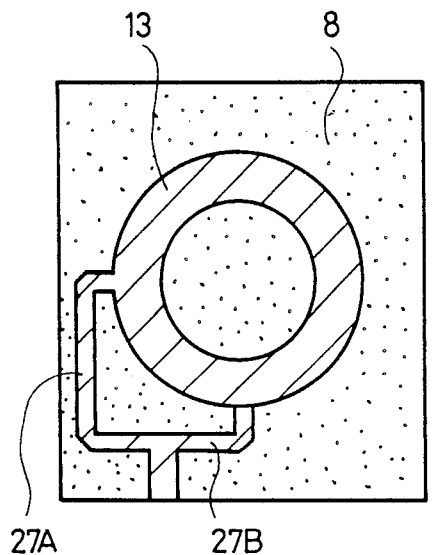
Figure 10:
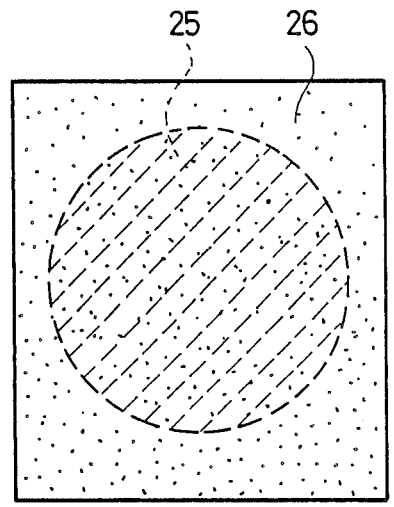

FIGS. 10(a)-10(c) show another microstrip antenna which includes a pair of strip lines 27A and 27B branched out from an end of the feeder 11 and connected to the outer periphery of the annular radiation conductor 13 at two points apart by a central angle of 90 degrees for circularly polarized excitation in the TM11 mode. This microstrip antenna produces the same results as those of the FIG. 8 embodiment wherein the two feeders 11A and 11B are provided at a central angle of 90 degrees for circularly polarized excitation in the TM11 mode.

Figure 11A:
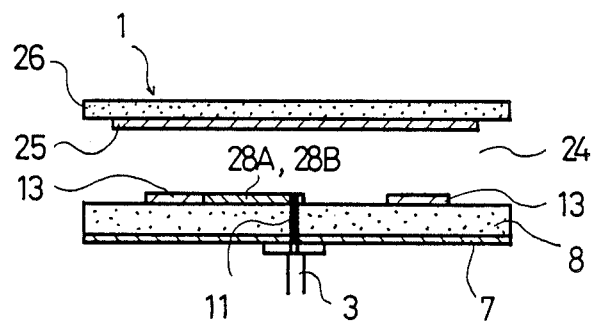
FIG. 11(a) is a sectional view of a microstrip antenna according to still another embodiment of the invention.
Figure 11B:
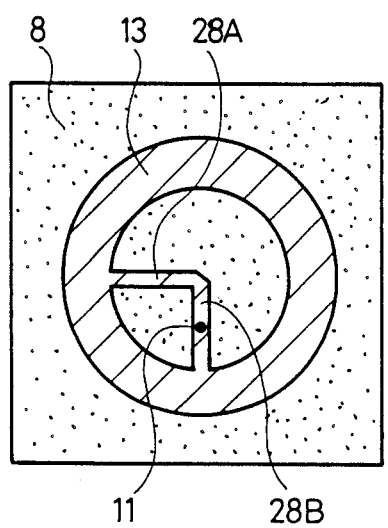
FIG. 11(b) is a plan view of the a annular radiation conductor of the microstrip antenna of FIG. 11(a)
Figure 11C:
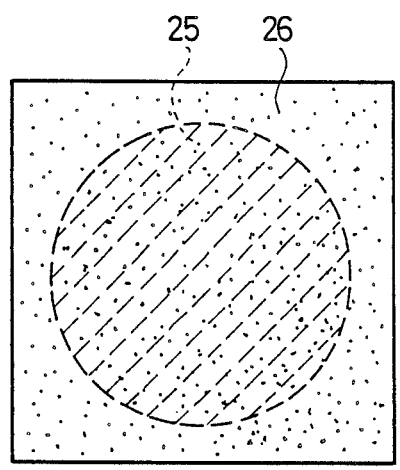
FIG. 11(c) is a plan view of the parasitic conductor of the microstrip antenna of FIG. 11(a)

FIGS. 11(a)-11(c) show still another microstrip antenna which includes two strip lines 28A and 28B branched out from an end of the feeder 11 and connected to the inner periphery of the annular radiation conductor 13 at a central angle of 90 degrees for circularly polarized excitation. This microstrip antenna produces the same results as those of FIG. 10 wherein the strip lines 27A and 27B are connected to the outer periphery of the annular radiation conductor 13 at a central angle of 90 degrees for circularly polarized excitation in the TM11 mode.

Figure 12:
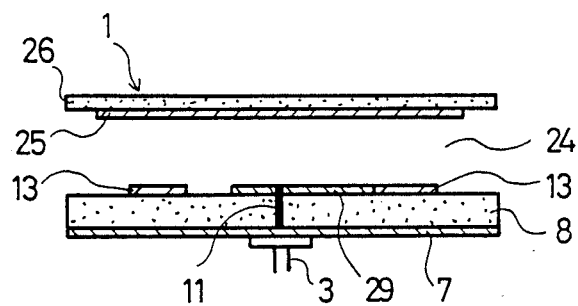
FIG. 12(a) is a sectional view of a microstrip antenna according to yet another embodiment of the invention.
FIG. 12(b) is a plan view of the a annular radiation conductor of the microstrip antenna of FIG. 12(a)
FIG. 12(c) is a plan view of the parasitic conductor of the microstrip antenna of FIG. 12(a)
Figure 12:
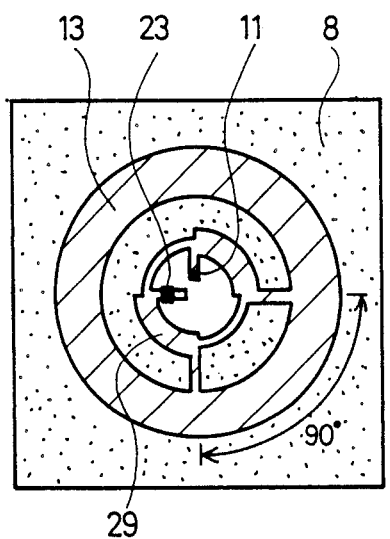
Figure 12:
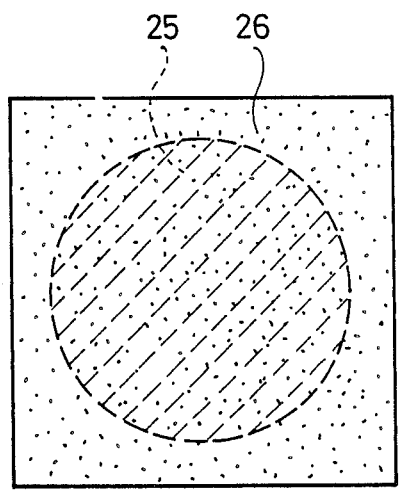

FIGS. 12(a)-12(c) show yet another microstrip antenna which includes a branched line hybrid circuit 29 with strip lines apart by 90 degrees within the central opening of the annular radiation conductor 13. By feeding the power to the inner periphery at two points apart by 90 degrees for circularly polarized excitation in the TM11 mode. This microstrip antenna produces the same results as those of the above embodiment. There is provided a chip resistor 23, too.

Figure 13:
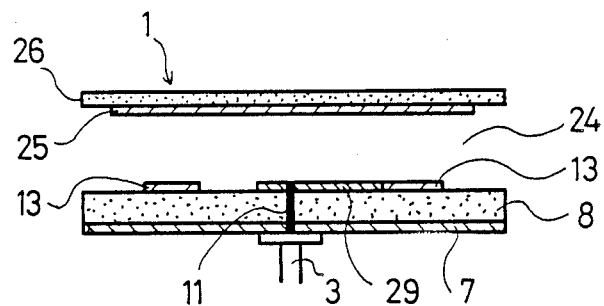
FIG. 13(a) is a sectional view of a microstrip antenna according to another embodiment of the invention.
FIG. 13(b) is a plan view of the the annular radiation conductor of the microstrip antenna of FIG. 13(a)
FIG. 13(c) is a plan view of the parasitic conductor of the microstrip antenna of FIG. 13(a)
Figure 13:
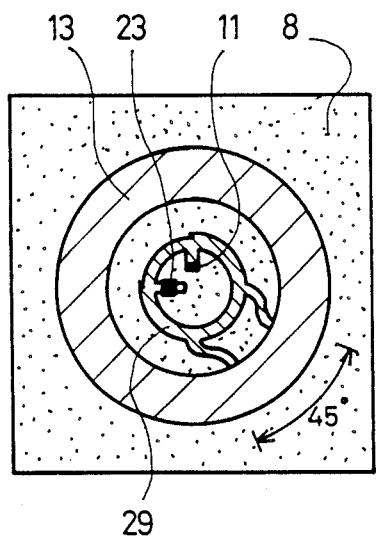
Figure 13:
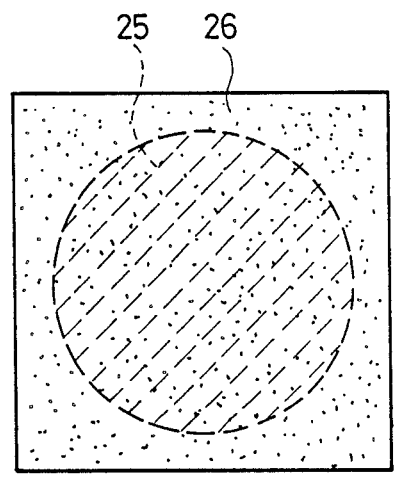
Figure 14:
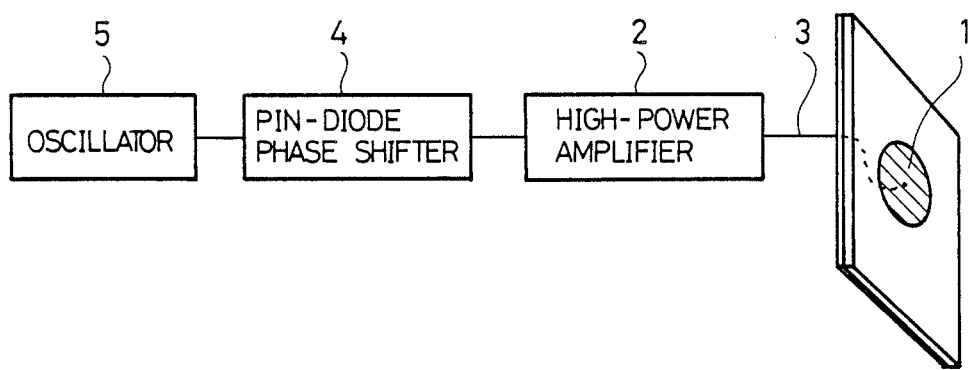
FIG. 14 is a block diagram of a conventional antenna system.

FIGS. 13(a)-13(c) show another microstrip antenna which includes a pair of connection terminals spaced apart by a central angle of 45 degrees for circular polarized excitation in the TM21 mode. This microstrip antenna produces the same results as those of FIG. 12 wherein the connection terminals connecting the annular radiation conductor 13 to the branched line hybrid circuit 29 are spaced apart by 90 degrees for circular polarized excitation in the TM11 mode. In addition, it is possible to design a branched line hybrid circuit 29 for the 50-ohm feeding system. There is also provided a chip resistor 23.

With the above microstrip antenna having a parasitic conductor opposed to the annular radiation conductor via a dielectric or air layer, it is possible to match a feeding system without using any matching circuit. Consequently, the width of a feeding strip line is sufficiently large to reduce the level of radiation from and the loss due to the strip line to thereby prevent adverse effects on the radiation pattern.

What is claimed is:

1. A microstrip antenna comprising:
    a planar dielectric body having at least two sides;
    an annular radiation conductor having means defining a central opening, said radiation conductor disposed on one side of said dielectric body;
    a ground conductor disposed on the other side of said dielectric body;
    at least one feeder and means defining a feeding point disposed within the central opening of said annular radiation conductor;
    a microwave circuit including at least conductor means for connecting said feeding point to said annular radiation conductor; and
    a planar parasitic conductor facing said annular radiation conductor and means forming a dielectric layer for support of said parasitic conductor, said parasitic conductor and dielectric layer being separated from said annular radiation conductor.

2. The microstrip antenna of claim 1, wherein said microwave circuit comprises a strip line which extends from the inner periphery of said annular radiation conductor to said feeding point.

3. The microstrip antenna of claim 1, wherein said microwave circuit comprises a microwave integrated circuit.

4. The microstrip antenna of claim 1, wherein said microwave circuit comprises an oscillator, a pin diode phase shifter, and an amplifier.

5. The microstrip antenna of claim 1, wherein said annular radiation conductor and said parasitic conductor are made in the form of a circle and said annular radiation conductor has an inner periphery.

6. The microstrip antenna of claim 1, wherein said annular radiation conductor and said parasitic conductor are made in the form of a square.

7. The microstrip antenna of claim 5 further comprising two feeders connected to said inner periphery of said annular radiation conductor at two points spaced apart by a central angle of 90 degrees to feed power with a phase difference of 90 degrees.

8. The microstrip antenna of claim 5 further comprising two feeders connected to said inner periphery of said annular radiation conductor at two points spaced apart by a central angle of 45 degrees for feeding power with a phase difference of 90 degrees.

9. The microstrip antenna of claim 5, wherein said feeder is branched out into two strip lines, ends of which are connected to an outer periphery of said annular radiation conductor at two points spaced apart by a central angle of 90 degrees.

10. The microstrip antenna of claim 5, wherein said feeder is branched out into two strip lines, ends of which are connected to said inner periphery of said annular radiation conductor at two points spaced apart by a central angle of 90 degrees.

11. The microstrip antenna of claim 5 further comprising a branched line hybrid circuit with strip lines connected to said inner periphery of said annular radiation conductor for feeding power at two points spaced apart by a central angle of 90 degrees.

12. The microstrip antenna of claim 5 further comprising a branched line hybrid circuit with strip lines connected to said inner periphery of said annular radiation conductor for feeding power at two points spaced apart by a central angle of 45 degrees.

13. The microstrip antenna of claim 1 including an insulator means positioned between said planar parasitic conductor and said annular radiation conductor.

14. The microstrip antenna of claim 13 wherein said insulator means comprises air.

15. The microstrip antenna of claim 1 including a dielectric means positioned between said planar parasitic conductor and said annular radiation conductor.

16. A microstrip antenna comprising:
a planar dielectric body having at least two sides;
an annular radiation conductor having inner and outer peripheries, said inner periphery defining a central opening, said radiation conductor being disposed on one side of said dielectric body;
a ground conductor disposed on the other side of said dielectric body;
at least one feeder and means defining a feeding point located within the central opening of the annular radiation conductor and spaced from the inner periphery of the radiation conductor;
a microwave circuit including at least conductor means intercoupling the feeding point and the annular radiation conductor, said microwave circuit extending parallel to the planar dielectric body;
wherein said annular radiation conductor opening is absent any further annular radiation conductor means therein.

17. The microstrip antenna of claim 16 wherein the microwave circuit comprises a strip line which extends from the inner periphery of the annular radiation conductor to the feeding point.

18. The microstrip antenna of claim 16 wherein the microwave circuit comprises a microwave integrated circuit.

19. The microstrip antenna of claim 16 wherein said annular radiation conductor comprises a single annular radiation conductor.

20. The microwave strip antenna of claim 16 further including a dielectric substrate over said planar dielectric body and under said microwave circuit, and a ground plane disposed between said dielectric substrate and said planar, dielectric body.

21. The microstrip antenna of claim 16 wherein said ground conductor, annular radiation conductor and conductor means extends in parallel planes.

22. The microstrip antenna of claim 21 wherein the ground conductor, annular radiation conductor and conductor means extend in separated respective planes.

23. The microstrip antenna of claim 16 wherein said microwave circuit comprises the only means for electrical conductive connection between said feeding point and said annular radiation conductor.

24. The microstrip antenna of claim 16 wherein said microwave circuit is of one-quarter wave length.

25. A microstrip antenna comprising:
a planar dielectric body having at least two sides;
an annular radiation conductor having inner and outer peripheries, said inner periphery defining a central opening, said radiation conductor being disposed on one side of said dielectric body;
a ground conductor disposed on the other side of said dielectric body;
at least one feeder and means defining a feeding point located within the central opening of the annular radiation conductor and spaced from the inner periphery of the radiation conductor and;
a microwave circuit including at least conductor means intercoupling the feeding point and the annular radiation conductor, said microwave circuit extending parallel to the planar dielectric body;
wherein the microwave circuit comprises an oscillator, a pin diode phase shifter, and an amplifier.

26. A microstrip antenna comprising:
a planar dielectric body having at least two sides;
an annular radiation conductor having inner and outer peripheries, said inner periphery defining a central opening, said radiation conductor being disposed on one side of said dielectric body;
a ground conductor disposed on the other side of said dielectric body;
at least one feeder and means defining a feeding point located within the central opening of the annular radiation conductor and spaced from the inner periphery of the radiation conductor;
a microwave circuit including at least conductor means intercoupling the feeding point and the annular radiation conductor, said microwave circuit extending parallel to the planar dielectric body; and
a planar parasitic conductor facing the annular radiation conductor and means forming a first dielectric layer for support of the parasitic conductor, said parasitic conductor and first dielectric layer being separated from said annular radiation conductor.

27. The microstrip antenna of claim 26 including an insulator means positioned between said planar parasitic conductor and said annular radiation conductor.

28. The microstrip antenna of claim 27 wherein the insulator means comprises air.

29. The microstrip antenna of claim 26 including a dielectric means positioned between said planar parasitic conductor and said annular radiation conductor.

* * * * *